United States Patent Office 3,459,639
Patented Aug. 5, 1969

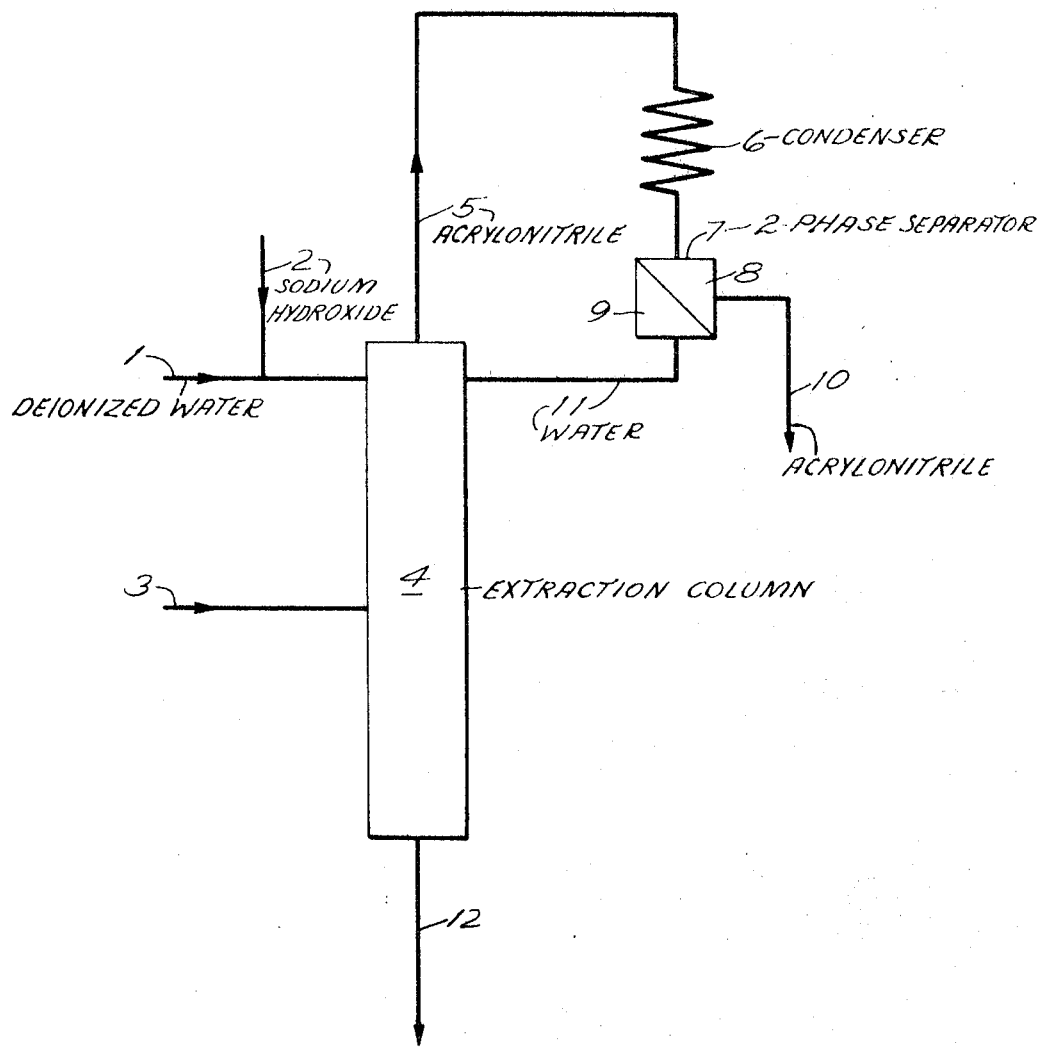

3,459,639
SEPARATION OF ACRYLONITRILE FROM VAPOR-PHASE REACTION MIXTURES BY EXTRACTIVE DISTILLATION WITH CONTROLLED pH OF THE MIXTURE
Marcel Borrel, Oullins, Rhone, and Jean Konareff, Venissieux, Rhone, France, assignors to Ugine Kuhlmann, Paris, France, a French corporation
Continuation-in-part of application Ser. No. 334,899, Dec. 31, 1963. This application Apr. 24, 1967, Ser. No. 633,287
Claims priority, application France, Jan. 5, 1963, 920,556
Int. Cl. B01d *11/00, 3/34*
U.S. Cl. 203—37                                                  7 Claims

ABSTRACT OF THE DISCLOSURE

This application describes a process for the purification of the complex mixture of acrylonitrile, acetonitrile and other materials formed in the vapor phase conversion of acrolein or propylene to acrylonitrile over a catalyst in the presence of ammonia and oxygen. The separation of acrylonitrile from acetonitrile is effected by extractive distillation using deionized water at a pH of at least 5 and preferably 5 to 7 and introduction of an alkaline agent to the distillation mixture.

RELATED APPLICATION

This application is a continuation-in-part of copending application Ser. No. 334,899 filed Dec. 31, 1963, now abandoned.

FIELD OF INVENTION

This invention is concerned with the separation of pure acrylonitrile and pure acetonitrile from the complex mixture formed during the catalytic conversion of propylene or acrolein to acrylonitrile in the presence of ammonia and oxygen in the vapor phase.

BACKGROUND OF INVENTION

There are many procedures for the production of acrylonitrile. This compound has become one of the most important and promising organic chemical intermediates available. It is a particularly desirable intermediate in the manufacture of a wide range of products, for example, plastics, synthetic rubber, synthetic fibers, soil conditioners, and the like. For many uses, acrylonitrile must be of high purity and for this reason strict specifications must be met in the commercial manufacture of acrylonitrile.

Each of the commercial procedures which are used for the preparation of acrylonitrile produces its own set of impurities and by-products and each presents its own problems of purification. Most commercial preparations produce a sufficiently large quantity of acetonitrile as a by-product to make it commercially attractive.

The reaction for the production of acrylonitrile from propylene or acrolein in the vapor phase over a catalyst in the presence of ammonia and oxygen produces a gaseous mixture which contains, in addition to the desired acrylonitrile and any excess starting material, a considerable number of impurities, particularly hydrocyanic acid, aldehydes and related nitriles, including the commercially valuable acetonitrile. Usually the purification is initiated by elimination of the ammonia, the insoluble gases and a portion of the water. An organic phase is obtained which is treated to condense the hydrocyanic acid and aldehydes to produce cyanohydrins. After elimination of these cyanohydrins, the bulk of the excess hydrocyanic acid is eliminated. The liquid mixture obtained at this stage of the purification still contains water, acetonitrile in quantities up to 20% by weight, small quantities of hydrocyanic acid, generally less than 0.1% of acrolein, generally less than 0.1% of higher nitriles, alcohols such as methanol, and allyl alcohol, acetone and other impurities.

It is known that these mixtures can be purified by distillation to produce on the one hand a liquid phase containing chiefly acetonitrile, water and the bulk of the higher nitriles and alcohols; and on the other hand, a mixture of vapors, which on condensation produce two liquid phases, one organic and the other aqueous. The aqueous phase may be recycled to recover valuable compounds which may be carried along with the water. Usually, the organic phase contains all of the small quantity of hydrocyanic acid introduced to the plant, 3 to 4 percent of the water, very small quantities of free or combined acrolein (of the order of a few tens of parts per million) and other impurities such as lactonitrile, acetone and various polymerizable material. The content of hydrocyanic acid of this organic phase is too high for the product to be employed in many of the applications of acrylonitrile.

The distillation which achieves the above purification is often as extractive distillation carried out in one or two successive extraction stages in which the extracting liquid is deionized water.

THE INVENTION

It has now been discovered in accordance with this invention that it is possible to substantially prevent the hydrocyanic acid from passing out of the top of the extraction column and collecting in the organic phase where it contaminates the acrylonitrile. It has been discovered in accordance with this invention that the extractive distillation can be carried out under conditions such that the hydrocyanic acid, despite its high volatility, separates at the bottom of the column with the acetonitrile. It is thus possible to prepare acrylonitrile of high purity containing such minute quantities of hydrocyanic acid that it is suitable for most commercial operations.

In accordance with the invention the bulk of the hydrocyanic acid is caused to separate from the mixture with the acetonitrile by carrying out the extractive distillation under conditions such that the pH of the water at the top of the extraction column is at least five and preferably between five and seven.

The pH at the top of the column is controlled by the use of at least partially deionized water having a pH in the desired range, that is, at least 5, or by the addition of a slightly soluble alkaline agent, particularly an alkali metal hydroxide such as sodium or potassium hydroxide to deionized water having a pH below the desired minimum.

The pH at the bottom of the column is maintained between 9 and 12, and preferably between 9 and 11. The alkaline reagent used to control the pH of the distillation mixture at the top and bottom of the column may be introduced, at least partially at the top of the column, or, if deionized water with a sufficiently low hydrogen ion concentration is used at the top of the column, the base can be added with the mixture to be purified or at the bottom of the column.

The invention may be better understood by reference to the attached drawing which schematically illustrates the process of one aspect of the invention.

In the drawing, 1 is the inlet for deionized water which serves as the extracting liquid. The alkaline agent, for example, 10% sodium hydroxide is introduced into the deionized water through pipe 2 just before it enters the extraction column 4. The complex mixture to be separated enters the extraction column 4 by pipe 3. The overhead vapors comprising acrylonitrile substantially free of hydrocyanic acid exit the column 4 through pipe 5 and condense in condenser 6. The condensate separates into 2 phases in separator 7. The aqueous phase 9 collects at the bottom and, as shown, is returned to the distillation column by pipe 11. Purified acrylonitrile is collected through pipe 10 and water containing separated by-products and impurities especially acetonitrile, hydrogen cyanide and complex derivatives of hydrogen cyanide are collected at the bottom of extraction column 4 through pipe 12.

The following examples illustrate the manner in which we now prefer to practice our invention. It is to be understood that this invention is not to be considered as restricted thereto except as indicated in the appended claims. In the examples, all quantities are in percent by weight.

Example 1

A reaction mixture from the production of acrylonitrile contained chiefly acrylonitrile and the following impurities:

| | Percent |
|---|---|
| Hydrocyanic acid | 0.028 |
| Acetonitrile | 3.8 |
| Water | 3.5 |
| Free acrolein | 0.025 |
| Other impurities | <0.5 |

This liquid was subjected to extractive distillations to separate a liquid mixture containing chiefly acetonitrile and water and a mixture of vapors which after condensation gave an organic and an aqueous phase. The water used for the extractive distillation was water of a pH of 4 to 5 from which the cations had been removed.

The organic phase separated contained more than 98% of the initial acrylonitrile and the following impurities:

| | Percent |
|---|---|
| Hydrocyanic acid | 0.021 |
| Acetonitrile | 0.02 |
| Water | 3.5 |
| Free acrolein | 0.022 |
| Other impurities | <0.1 |

When operating in accordance with this invention, i.e. by introducing in the deionized water feeding the distillation column through pipe 2, a quantity of sodium hydroxide in the form of a 10% aqueous solution, sufficient to bring the pH of the water feeding the column to a value of 7.0, a similar organic phase was obtained except that the content of total hydrocyanic acid was 0.0007% instead of 0.021%. In this manner, through the use of the invention, the practically complete separation of hydrocyanic acid was achieved at the same time as that of acetonitrile, whilst the known methods permitted only the separation of the acetonitrile and made necessary a later operation in order to bring the content of the hydrocyanic acid in acrylonitrile to a value compatible with the present specifications of industry.

Example 2

A liquid similar to that of Example 1 which consisted chiefly of acrylonitrile contained the following impurities:

| | Percent |
|---|---|
| Hydrocyanic acid | 0.028 |
| Acetonitrile | 2.20 |
| Water | 3.70 |
| Free acrolein | 0.031 |
| Other impurities | <0.5 |

This liquid was subjected to the same operations as in Example 1. In the deionized water a quantity of soda was introduced so that the pH at the bottom of the column was 10.2. The organic phase separated as a distillate contained more than 99.5% of the initial acrylonitrile and the following impurities:

| | Percent |
|---|---|
| Hydrocyanic acid | 0.0002 |
| Acetonitrile | 0.005 |
| Water | 3.50 |
| Free acrolein | 0.025 |
| Other impurities | 0.1 |

Here also, it is seen that the practically complete separation of hydrocyanic acid was obtained at the same time as that of acetonitrile.

What is claimed is:

1. A process for the separation of acrylonitrile from the mixture resulting from the vapor phase production of acrylonitrile from propylene or acrolein over a catalyst in the presence of oxygen and ammonia, and containing up to 20% acetonitrile, together with hydrocayanic acid by extractive distillation of said mixture with deionized water in a distillation column, which comprises introducing deionized water as the extraction liquid into the top of the column, while maintaining the pH of the mixture at the top of the extraction-distillation column at a value of 5 to 7, and the pH of the mixture at the bottom of the column at a value of 9 to 12, by the addition of an alkaline agent to the distillation mixture in the distillation column, collecting acrylonitrile substantially free of hydrocyanic acid from the top of the extraction column, and collecting an impure mixture containing water, hydrocyanic acid and to the distillation mixtures in the distillation column.

2. A process as in claim 1 in which the pH values are maintained by the addition of an alkali metal hydroxide to the distillation mixtures in the distillation column:

3. A process as in claim 2 in which the alkali metal hydroxide is sodium hydroxide.

4. A process as in claim 2 in which the pH values are maintained by the addition of at least a part of the alkali metal hydroxide in the distillation mixture at the top of the distillation column.

5. A process as in claim 2 in which the pH values are maintained by the addition of at least a part of the alkali metal hydroxide to the distillation mixture with the feed.

6. A process as in claim 2 in which the pH values are maintained by the addition of at least a part of the alkali metal hydroxide to the distillation mixture at the bottom of the distillation column.

7. A process as in claim 2 in which the pH values are maintained by the addition of at least a part of the alkali metal hydroxide to the distillation mixture with the deionized water.

References Cited

UNITED STATES PATENTS

| | | | |
|---|---|---|---|
| 2,827,423 | 3/1958 | Carpenter | 203—37 |
| 2,956,029 | 10/1960 | Higgins et al. | 260—465.3 X |
| 3,005,517 | 10/1961 | Idol et al. | 260—465.3 X |
| 3,051,630 | 8/1962 | Hadley et al. | 203—44 |
| 3,185,636 | 5/1965 | Stevens et al. | 203—8 |
| 3,264,197 | 8/1966 | Schonbeck et al. | 260—465.3 X |
| 3,073,753 | 1/1963 | Hadley et al. | 203—81 |

NORMAN YUDKOFF, Primary Examiner

F. E. DRUMMOND, Assistant Examiner

U.S. Cl. X.R.

203—96; 260—465

UNITED STATES PATENT OFFICE
CERTIFICATE OF CORRECTION

Patent No. 3,459,639            August 5, 196

Marcel Borrel et al.

It is certified that error appears in the above identified patent and that said Letters Patent are hereby corrected as shown below:

Column 4, line 34, "to the distillation mixtures in the distillation column." should read -- acetonitrile from the bottom of the column. --.

Signed and sealed this 21st day of April 1970.

(SEAL)
Attest:

Edward M. Fletcher, Jr.            WILLIAM E. SCHUYLER, J.
Attesting Officer            Commissioner of Patent